United States Patent

[11] 3,595,524

| [72] | Inventor | David E. Mominee |
| | | Covina, Calif. |
| [21] | Appl. No. | 13,992 |
| [22] | Filed | Feb. 25, 1970 |
| [45] | Patented | July 27, 1971 |
| [73] | Assignee | Byron Curry |
| | | Arcadia, Calif. |

[54] SPRAY STRUCTURE
11 Claims, 3 Drawing Figs.

[52] U.S. Cl. .................................................. 251/342
[51] Int. Cl. ................................................... F16k 31/58
[50] Field of Search ....................................... 251/342,
340, 341, 349, 350; 239/290

[56] References Cited
UNITED STATES PATENTS

| 2,127,188 | 8/1938 | Schellin et al. | 239/440 |
| 2,313,994 | 3/1943 | Grant | 239/440 |
| 2,709,624 | 5/1955 | MacChesney | 251/121 X |
| 2,834,520 | 5/1958 | Nyden | 251/349 X |
| 2,859,932 | 11/1958 | Mackal | 251/349 |
| 2,901,153 | 8/1959 | Collins | 251/349 X |
| 2,946,555 | 7/1960 | Cantor | 251/342 |
| 3,108,721 | 10/1963 | Nebinger | 251/350 X |
| 3,346,412 | 10/1967 | Siegenthaler et al. | 239/290 X |
| 3,365,166 | 1/1968 | Smith | 251/121 |

Primary Examiner—Samuel Scott
Attorney—Edward D. O'Brian

ABSTRACT: A two part spray structure or valve intended to be used in watering plants is disclosed. One of the parts of the valve includes a member of uniform cross-sectional configuration having a groove extending along its length from one of its ends. A resilient tube adapted to be connected to a source of water under pressure is located over this end of the member. By regulating the position of the tube upon the member with respect to the groove it is possible to control the flow of water from within the interior of the tube.

PATENTED JUL 27 1971
3,595,524
FIG.1.
FIG.2.
FIG.3.
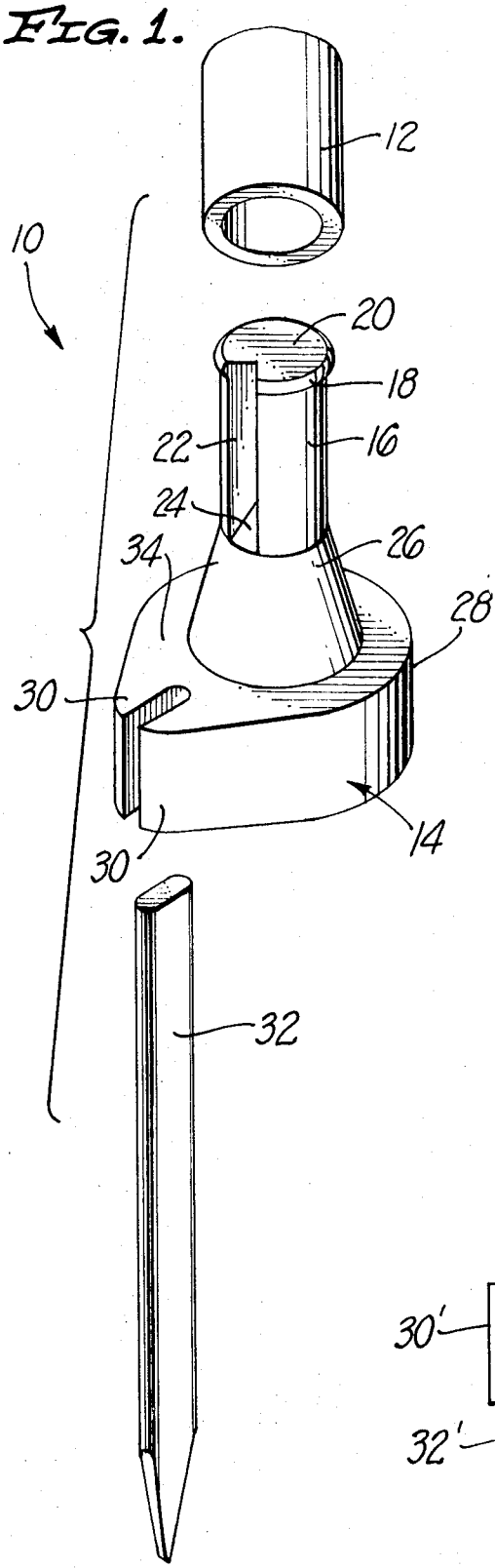
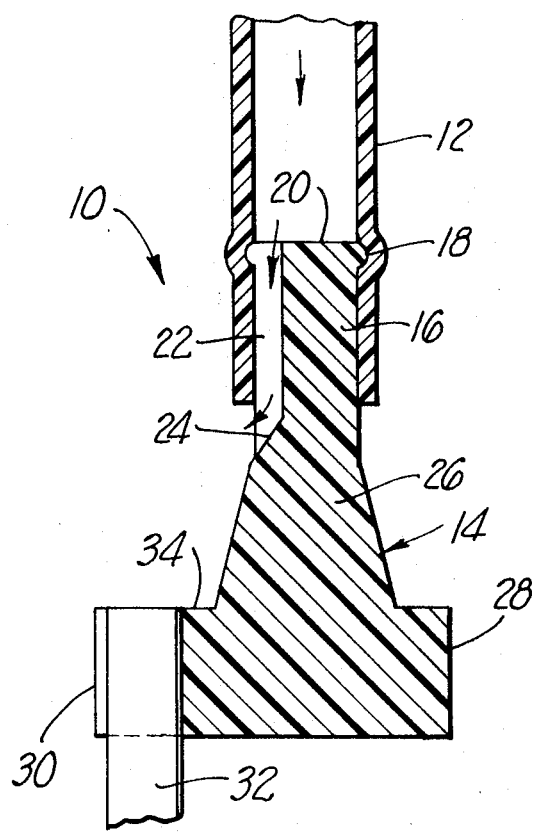
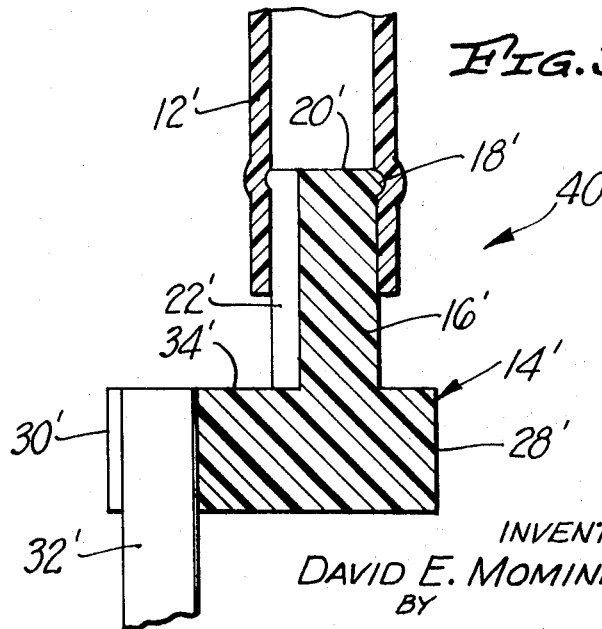
INVENTOR
DAVID E. MOMINEE
BY
EDWARD D. O'BRIAN
ATTORNEY 3,595,524

SPRAY STRUCTURE

BACKGROUND OF THE INVENTION

Many thousands of different types of valves are known. In spite of this there are still needs for specific new and improved types of valves for specialized applications or uses. One of the fields where new and specialized valves are needed is in the field of watering plants. A number of different structures and procedures have, of course, been developed for use in this field.

Currently it is frequently desired to water plants using small individual spray devices located in the areas where plants are being grown, and to supply such spray devices with water using a flexible plastic tube. In order to be acceptable a device used for this type of watering should be of such a character as to be capable of being easily adjusted so as to either shut off the flow of water or so as to regulate the flow of water. Further, a device of this type to acceptable should be comparatively inexpensive and simple, and should be capable of giving prolonged satisfactory performance. It is not considered that any existing watering device meet all of these needs for acceptability.

SUMMARY OF THE INVENTION

An objective of the present invention is to provide new and improved watering or spray devices for use in watering plants. Another objective of this invention is to provide devices of the class described which may include means for creating a spray and which may be utilized so as to achieve a valving action. Although the invention is primarily directed to the use of devices as described in watering plants it is to be understood that devices as herein described can be utilized for other purposes.

Further objectives of this invention are to provide structures of the class described which are relatively simple, which may be easily and conveniently produced, which are relatively inexpensive, which are capable of being easily used and which are capable of giving prolonged, satisfactory performance.

In accordance with this invention these objectives are achieved by providing a two-part structure which includes a member of uniform cross-sectional configuration having a groove extending along its length from one of its ends. With the invention a resilient tube is located on this end of the member so that a fluid may flow through the tube and out between the tube and the member through the groove. With this structure the amount of flow can be regulated by regulating the position of the tube on the member so as to either cover all or any part of the groove used.

BRIEF DESCRIPTION OF THE DRAWINGS

A summary of this type inherently is incapable of indicating all features of an invention. Details of the present invention as well as the manners in which it achieves the noted objectives are best explained with reference to the accompanying drawing in which:

FIG. 1 is an exploded isometric view of the parts of a presently preferred form or embodiment of a spray structure in accordance with this invention;

FIG. 2 is a cross-sectional view of a spray structure of the invention assembled from the parts illustrated in FIG. 1; and FIG. 3 is a cross-sectional view corresponding to FIG. 2 of a modified spray structure in accordance with this invention.

The accompanying drawing is primarily intended so as to clearly indicate the nature of the structures shown in it. Because of this the valves shown in it are not to be taken as being shown to any precise scale. It will be realized that various modifications and changes may be made in the illustrated structures through the use of routine engineering skill without departing from the basic features or principles embodied within these structures.

DESCRIPTION OF THE PREFERRED EMBODIMENT

In the initial figures of the drawing there is shown a spray structure or valve 10 in accordance with this invention. This valve has two "basic" parts: a flexible cylindrical tube 12 and a comparatively rigid base 14. The tube 12 is adapted to be connected to any convenient source of fluid under pressure such as a water distribution line. Preferably this tube 12 is formed out of a somewhat resilient material such as a flexible vinyl composition, a rubber composition or the like so as to be capable of being pushed on the surface of a member 16 forming a part of the base 14 so as to be in fluid-type engagement with this member 16. The walls of the tube 12 should be sufficiently thick so as to be capable of holding fluid under at least moderate pressure without significant deformation.

The member 16 is preferably is of cylindrical shape. It is shaped so that its outer diameter is approximately the same as or slightly greater than the internal diameter of the tube 12. This enables the tube 12 to be fitted over the member 16 as described. The fit between these two parts should, however, be of such a character that the tube 12 may be slid along the length of the member 16 by manual manipulation.

Preferably a beadlike bump 18 extending around the member 16 adjacent to a closed end 20 of it is used so as to aid in preventing accidental or undesired movement of the tube 12 with respect to the member 16. This bump temporarily distends the portion of the tube 12 opposite it so as to present an impediment to movement of the tube 12 relative to the base 14.

The member 16 includes an elongated groove 22 extending from the end 20 along its length. This groove 22 includes an outwardly sloping terminal wall 24 remote from the end 22. The wall 24 is designed so as to deflect fluid such as water outwardly in a spraylike manner during the use of the entire valve 10.

In this valve 10 the member 16 is carried by and is integral with a stop 26 having the shape of a frustum or a right circular cone. It will be noted that the small end of the stop 26 with the structure shown is contiguous with the external surface of the member 16. With the structure illustrated this stop 26 is mounted upon a holder 28 which also forms a part of and is integral with the base 14. The holder 28 includes spaced groove walls or fingers 30 which are adapted to resiliently engage a flat rodlike support 32.

When the valve 10 is to be used the support 32 is located in a desired location as by being pushed into the ground. If the base 14 has not previously been assembled upon the support 32 it may then be located upon the support. With this manner of location the member 16 of the valve stem will be held essentially vertical. The tube 12 may then be pushed over the member 16 so as to at least partially cover the groove 22. When so assembled fluid such as water may be supplied through the tube 12. So long as the groove 22 is not completely covered some of such fluid will flow between the member 16 and tube 12 through the groove 22 and will be deflected outwardly in a spraylike manner by engagement with the wall 24.

The amount of such fluid flowing in this manner may be easily regulated by adjusting the relative position of the tube 12 with respect to the member 16. When the groove 22 is completely covered flow will be completely stopped. The stop 26 is designed so that the tube 12 may be pushed past the member 16 and the wall 24 of the groove 22 in such a manner that the terminus of it is flared outwardly by contact with the stop 26. Such flaring of the end of the tube 12 will cause a firm engagement of the tube 12 so that there is no substantial possibility of leakage when flow through the valve 10 is shut off.

It will be realized from this that a shutoff action may be achieved by placing the end of the groove 22 a short distance from the stop 26. If desired a plurality of grooves corresponding to the groove 22 may be used. A groove 22 need not have a sloping wall such as the wall 24, although the sloping wall 24 is preferred in obtaining a spray type of action. If the fluid flow during the use of the valve 10 is inadequate to cause the wall 24 to perform in its intended manner to create a spray to a degree a disbursal of water will occur by water flowing out of the groove 22 so as to fit against this upper surface 34 so as to achieve a spray action in this manner during "normal" operation of the valve 10.

A structure of this type is indicated in FIG. 3 of the drawing. Here there is shown a spray valve 40 which is essentially very similar to the valve 10. For this reason the various parts of the valve 40 which are identical to or substantially identical to various parts of the valve 10 are not separately identified herein, and are referred to in the remainder of this specification and in the drawing by the primes numerals previously used to designate such parts.

From an examination of FIG. 3 it will be apparent that the valve differs from the valve 10 by omitting the stop 26. Thus, in the valve 40 the member 16' is mounted directly upon the surface 34' of the holder 28'. It will be also noted that the valve 40 omits the wall 24. With this structure the surface 34' of the holder 28' serves as a deflection surface so as to tend to spread water outwardly in a spraylike manner. The valve 40 is otherwise used in the same manner as the valve 10. Fluid flow can be stopped or nearly stopped by moving the tube 12' into contact with the surface 34' of the holder 28.

I claim:
1. A spray structure which comprises:
 a member having a surface of a uniform cross-sectional configuration and a closed end, located at an extremity of said surface,
 a base holding said member, said base including means for supporting said member and said base,
 a tube adapted to be connected to a source of a fluid located so as to extend over said end of said surface, said tube frictionally engaging said surface,
 a groove located between said member and said tube, said groove extending from said end of said surface and having an end remote from said end of said surface,
 said tube fitting closely against said surface of said member so that fluid cannot pass between said surface of said member and the interior of said tube,
 said tube being capable of being moved along the length of said surface so as to vary the relative positions of said tube and said member in order to control the flow of fluid through said groove,
 said member being provided with a deflecting surface opposite said end of said groove, said surface being located with respect to said groove so as to be capable of deflecting fluid moving through said groove away from said member in a spraylike manner.
2. A spray structure as claimed in claim 1 wherein:
 said groove is located in said surface of said member;
 said tube is capable of being moved along the length of said surface so as to cover said end of said groove in order to prevent the flow of fluid through said groove.
3. A spray structure as claimed in claim 1 wherein:
 said groove is located in the surface of said member;
 said deflecting surface is a sloping surface.
4. A spray structure as claimed in claim 1 wherein:
 said tube is of a resilient material and resiliently engages the exterior of said surface;
and including:
 bead means for holding said tube in position on said surface located on the exterior of said surface adjacent to said end of said surface;
 said tube is distended by engagement with said bead means so as to be held in a fixed position by contact therewith;
 a stop forming a part of said member, said stop having a conical exterior surface leading outwardly and away from said surface at the extremity of said surface remote from said closed end and wherein;
 said tube is capable of engaging a portion of said conical surface of said stop so as to close off the flow of fluid in said groove between said member and said tube.
5. A spray structure as claimed in claim 1 wherein:
 said groove is located in said surface of said member;
 said tube is capable of being moved along the length of said surface so as to cover said end of said groove;
 said deflecting surface is a sloping surface;
 said tube is of a resilient material and resiliently engages the exterior of said member.
6. A spray structure as claimed in claim 1 wherein:
 said groove is located in said surface of said member;
 said tube is of a resilient material and resiliently engages the exterior of said surface.
7. A spray structure as claimed in claim 6 including:
 bead means for holding said tube in position on said surface located on the exterior of said surface adjacent to said end of said surface,
 said tube is distended by engagement with said bead means so as to be held in a fixed position by contact therewith.
8. A spray structure as claimed in claim 6 including:
 a stop forming a part of said member, said stop having a conical exterior surface leading outwardly and away from said surface at the extremity of said surface remote from said closed end, and wherein;
 said tube is capable of engaging a portion of said conical surface of said stop so as to close off the flow of fluid in said groove between said member and said tube.
9. A spray structure which includes:
 a base,
 a support for use in supporting said base attached to said base,
 a member attached to said base so as to extend therefrom, said member having a groove extending along its length, said groove leading to a wall,
 a tube fitting closely against the exterior of said member so that fluid cannot pass between the interior of said tube and the exterior of said member, said tube covering said groove and terminating away from said wall,
 said wall being located relative to said groove so that fluid passing through said tube and said groove will engage said wall so as to be sprayed outwardly by contact with said wall.
10. A spray structure as claimed in claim 9 wherein:
 said tube is of a resilient material and resiliently engages the exterior of said member, and
 said wall is a sloping wall, sloped relative to said groove.
11. A spray structure as claimed in claim 9 wherein:
 said tube is of a resilient material and resiliently engages the exterior of said member and said wall extends transverse to the direction of said groove.